(12) United States Patent
Hagemann et al.

(10) Patent No.: US 7,959,134 B2
(45) Date of Patent: Jun. 14, 2011

(54) CONTACT BODY FOR AN EVAPORATION HUMIDIFIER OR MATERIAL EXCHANGER

(75) Inventors: Helgo Hagemann, Ochtrup (DE); Ralf Wolbeck, Ochtrup (DE)

(73) Assignee: GEA 2H Water Technologies GmbH, Wettringen (DE)

( * ) Notice: Subject to any disclaimer, the term of this patent is extended or adjusted under 35 U.S.C. 154(b) by 437 days.

(21) Appl. No.: 11/816,837

(22) PCT Filed: Mar. 24, 2006

(86) PCT No.: PCT/EP2006/002715
§ 371 (c)(1),
(2), (4) Date: Feb. 3, 2009

(87) PCT Pub. No.: WO2006/103028
PCT Pub. Date: Oct. 5, 2006

(65) Prior Publication Data
US 2010/0072636 A1 Mar. 25, 2010

(30) Foreign Application Priority Data

Mar. 26, 2005 (DE) .................... 20 2005 004 859 U

(51) Int. Cl.
*B01F 3/04* (2006.01)
(52) U.S. Cl. ..................... 261/112.2; 428/184
(58) Field of Classification Search ............. 261/29, 261/30, 36.1, 101–103, 112.1, 112.2; 428/163, 428/182, 184
See application file for complete search history.

(56) References Cited

U.S. PATENT DOCUMENTS

| | | | | |
|---|---|---|---|---|
| 2,019,186 A | * | 10/1935 | Kaiser | 96/390 |
| 2,555,125 A | * | 5/1951 | Gregory | 55/440 |
| 2,963,128 A | * | 12/1960 | Rapp | 428/594 |
| 3,286,999 A | * | 11/1966 | Takeda | 261/30 |
| 3,395,903 A | * | 8/1968 | Norback et al. | 261/112.2 |
| 3,574,032 A | * | 4/1971 | Norback et al. | 156/291 |
| 3,785,620 A | * | 1/1974 | Huber | 366/175.2 |
| 4,296,050 A | * | 10/1981 | Meier | 261/112.2 |
| 4,427,607 A | * | 1/1984 | Korsell | 261/112.2 |
| 4,518,544 A | * | 5/1985 | Carter et al. | 261/112.2 |

(Continued)

FOREIGN PATENT DOCUMENTS

DE  2607312 A1 * 9/1976

(Continued)

*Primary Examiner* — Richard L Chiesa
(74) *Attorney, Agent, or Firm* — Greer, Burns & Crain, Ltd.

(57) ABSTRACT

A contact body for an evaporation humidifier or material exchanger, is formed of corrugated material layers. The novel contact body has material layers which are a thermoplastic plastic and are interconnected by welding and/or bonding and or a positive fit. The corrugation axes at two longitudinal edges of each material layer form a corrugation axis section that runs approximately in an orthogonal direction in relation to the respective longitudinal edge and the axes between the corrugation axis sections have oblique regions that run in at least two different directions with at least one change of direction in between, in such a way that in each material layer the corrugation axes change direction at least three times. The corrugation axes in a first oblique area lie at an angle $\alpha 1$ to the neighboring longitudinal edge and in a second oblique area lie at an angle $\alpha 2$ to the other longitudinal edge. The angles $\alpha 1$ and $\alpha 2$ are between 30° and 60°. The maximum height of the corrugated material layers is 12 mm.

23 Claims, 3 Drawing Sheets

U.S. PATENT DOCUMENTS

| | | | |
|---|---|---|---|
| 4,579,694 A * | 4/1986 | Bradley, Jr. | 261/112.2 |
| 4,657,711 A * | 4/1987 | Wigley | 261/79.2 |
| 4,675,103 A * | 6/1987 | Nadudvari et al. | 210/150 |
| 4,801,410 A * | 1/1989 | Kinney et al. | 261/112.2 |
| 5,167,879 A * | 12/1992 | Streng | 261/112.2 |
| 5,950,454 A * | 9/1999 | Burst et al. | 62/643 |
| 6,938,885 B2 * | 9/2005 | Koo | 261/112.2 |
| 7,147,215 B2 * | 12/2006 | Lehman et al. | 261/112.2 |
| 2003/0047821 A1 * | 3/2003 | Zich et al. | 261/153 |

FOREIGN PATENT DOCUMENTS

| | | | |
|---|---|---|---|
| DE | 28 31 639 | 1/1980 | |
| DE | 88 14 542 | 3/1989 | |
| DE | 39 05 696 | 10/1989 | |
| DE | 3901213 A1 * | 7/1990 | 261/112.2 |
| EP | 0 544 471 | 8/1993 | |
| GB | 1 496 127 | 12/1977 | |

\* cited by examiner

CONTACT BODY FOR AN EVAPORATION HUMIDIFIER OR MATERIAL EXCHANGER

BACKGROUND OF THE INVENTION

This invention relates to a contact body for an evaporation humidifier or material exchanger for the humidification, cooling and/or cleaning of gases, wherein the contact body consists of a plurality of corrugated material layers which adjoin each other and thus form a space lattice structure, wherein, on the one hand, a liquid can be passed from the top through the contact body and, on the other hand, a gas flow can be passed through in cross flow to the liquid for humidification, cooling and/or cleaning of the gas flow. In addition, the invention relates to an evaporation humidifier or material exchanger with at least one contact body.

Evaporation humidifiers and material exchangers for the initially mentioned purpose, as well as contact bodies for it are known from practical applications. Evaporation humidifiers or material exchangers of the mentioned type are used, inter alia, for humidification of the air and for simultaneous air cooling, for example of residential or office buildings, of warehouses, greenhouses, stables and other rooms or also of technical installations, for removing dust from intake or exhaust air, and for a reactive cleaning of gas or air, e.g. the elimination of odors, such as ammonia, from the waste air of stables. The corrugated material layers arranged side by side and forming the contact body have a large surface in relation to the volume taken up by the contact body, and this surface is wetted by charging the contact body with liquid. By means of the gas flow passing through the contact body in cross flow to the liquid, evaporation of the liquid is achieved and the gas flow is thereby humidified and—as a result of the physically inevitable evaporation cold—cooled at the same time. Solid particles, such as dust particles, from the gas flow are retained in the liquid and thus removed from the gas flow. Moreover, chemical reactions can be caused or, respectively, take place in the contact body between substances in the gas flow and the liquid or substances added to the liquid, such reactions having a desired chemical effect, e.g. cleaning effect.

In the contact bodies known from practice, the corrugation axes in the individual material layers extend rectilinearly from one longitudinal edge to the other longitudinal edge of each material layer which provides the advantage of a simple manufacture of the material layers; however, disadvantageously it results in the air flowing through the contact body having a very low flow resistance and consequently flowing through the contact body at a high flow velocity and an accordingly short dwell period. Moreover, a contact body with such simple corrugated material layers allows light to pass through the material layers in longitudinal direction of the corrugation axes which is a nuisance and undesirable in some applications, especially in stables with an artificial day/night rhythm.

For contact bodies of the aforementioned type and for the described purposes of application, two materials are known from practice for the corrugated material layers. The first material is a paper which, by means of an impregnation, is wettable on the one hand and stiffened on the other hand so that the contact body produced from it is self-supporting. Moreover, the impregnation is to prevent the decomposition of the contact body under the effect of water and air. As a starting material, paper is very economical; however, it has been shown in practice that, despite the impregnation, a contact body of this material has only relatively limited stability and durability. This brings about that a renewal of the contact body is required relatively often. Moreover, this material is not acid-proof so that it is not possible to clean the contact body by means of an acid, e.g. decalcification by means of formic acid or citric acid. Moreover, the low mechanical stability of this material precludes cleaning of the contact body by means of a high-pressure water jet because that would result in the immediate destruction of the paper. In practice, contact bodies of paper accordingly achieve only relatively short service periods, even in case of low burdens.

As a second material for the corrugated material layers, a fiberglass material is known from pertinent practice which is inorganic, corrosion-resistant, hygroscopic and incombustible. This material can, in fact, expect longer durability and stability; however, this is obtained only at the price of high expenditures for the material.

Furthermore, a disadvantage of the known contact bodies is that any normally used bonding of the material layers made of the abovementioned materials with each other is not permanently durable. Especially in contact bodies which are used in interval operation, i.e. which are intermittently moist or wet and intermittently dry, the layer materials in the area of the adhesive connections are especially stressed and lose relatively fast their connection with the adhesive. In the most unfavorable case, this results in a decomposition of the contact body and thus its uselessness. Acids as well are here usually detrimental for bonding the material layers.

DE 28 31 639 C2 presents a plate battery for material and heat exchangers and mist collectors, with a plurality of opposite corrugated plates whose corrugation bottoms form crossing flow channels; with neighboring plates, the corrugation crests touch or are set opposite each other at a gap, and the flow channels have fixtures which influence the flow. Furthermore, it is here provided that transverse walls are arranged in the flow channels, the walls being allocated—touching or at a gap—to the corrugation crests of the respectively neighboring plates, and that so to speak three-dimensional, zigzag flow paths are formed from the flow channel sections of neighboring plates. The plates may consist of plastic and be formed by deep-drawing.

With this known plate battery, it is considered a disadvantage that the corrugations respectively comprise rectilinear corrugation axes extending through the full thickness of the plate battery. So that the air flowing through the plate battery does not flow through it with a dwell period that is too short and at a velocity that is too high, the additional transverse walls must be arranged on the inside of the plate battery which renders its manufacture expensive. Moreover, the continuous rectilinear arrangement of the corrugation axes presents a high risk that liquid supplied from the top into the plate battery passes out at the front and the rear of the plate battery, i.e. at the air upflow side and the air downflow side and is thus discharged from it so that this part of the liquid is practically no longer available for an exchange with the air flow.

DE 26 07 312 B2 presents a device for the humidification of air flowing through a chamber, comprising a plurality of contact bodies for water and air which are mounted in the chamber and which consist of a plurality of parallel, corrugated plates which are watered with water flowing in vertical direction and being separated from each other by means of spacers for the purpose of enabling the flow of air in horizontal direction between the plates. It is here provided that the folds of the contact plates essentially extend vertically, with their fold heights being so low and their fold sequence so short that the water supplied to the plates is retained as a result of the capillary force over virtually the entire plate surface, and that the spacers consist of corrugated support plates whose folds essentially extend horizontally. This device is to solve in particular the problem of preventing the entrainment of water droplets by the air flowing through the device. The material in the contact plates can be either hygroscopic, paper for example, or non-hygroscopic, metal or plastic, for example.

It is considered disadvantageous with this device that the water flows very fast through the device due to the vertically extending flow paths and thus has only a short dwell period in the device. The same applies for the air flow permeating the device and passing through the device on rectilinear horizontal flow paths with low flow resistance and correspondingly high flow velocity. Accordingly, the air flow also has only an unfavorably short dwell period within the device. Thus, the device has a relatively low efficiency with regard to the desired humidification of the air.

From EP 0 554 471 B1, a built-in element is known for heat exchanger, material exchanger or bioreactor systems, wherein the element can be flowed through in counter flow or in cross counter flow along flow paths formed therein of two fluid mediums being in exchange or reaction with each other, wherein the element comprises an inlet side and an outlet side for the first medium and an inlet side and an outlet side for the second medium, wherein the element consists of at least two walls, fastened on top of each other, made of thermoplastic plastic film, with the walls each designed as corrugated surfaces with essentially parallel crest areas and sole areas, with fastening points being arranged in the crest and sole areas and with two neighboring walls fastened onto each other being arranged to each other such that the alignments of the crest and sole areas are at an angle $\beta$ to each other. It is here furthermore provided that the built-in element comprises—in the direction of flow of one of the two fluid mediums—modularly series-connected element sections, wherein, respectively, from one element section to the next following element section, the flow ratio changes between the two fluid mediums from counter flow at an angle $\beta=0$ to cross counter flow at an angle $\beta\neq 0$, or from cross counter flow at an angle $\beta\neq 0$ to cross flow at an angle $\beta=0$. This built-in element is used as a so-called trickling element in cooling towers for power stations or chemical plants. They create large surfaces and long flow paths which are to be accommodated in a compact three-dimensional space. The height of the corrugation in the individual layers is usually about 20 to 30 mm; it is thus relatively large. The exterior form can be, for example, that of a cuboid or a cylinder. The fluid mediums which flow through such built-in elements dwell therein, due to the design, for a sufficiently long time for a heat or material exchange in a chemical or biological reaction; the mediums can be, for example, a liquid flowing by gravity through the element and a gas conveyed by a fan through the element. These known built-in elements are used, as a rule, to built counter-flow cooling devices in which water flows from the top to the bottom and air flows from the bottom to the top. The water flowing through the built-in elements is thus cooled by the air flowing in counter flow, with evaporated water escaping with the exhaust air of the cooling tower without any utilization into the atmosphere. Each individual built-in element for a cooling tower is relatively large, with a standard height of 300 mm or more and a width as large. In practice, the length of a cooling tower built-in element amounts to more than 2 meters. Moreover, a plurality of layers, mostly four to six, of the built-in elements are arranged one on top of the other in a cooling tower. In the same manner, a plurality of built-in elements is positioned side by side in each layer. An overall very large built-in installation results within the cooling tower and it must have, by necessity, a considerable size to realize any cooling effect at all for the water. In contrast thereto, the contact body according to this patent application is intended to be used as a spatially small and compact unit which is flowed through in cross flow by a liquid and a gas flow, wherein the liquid flows from top to bottom due to the effect of gravity and the gas flow flows transversely thereto in a mean horizontal direction. Would a cooling tower built-in element—which is per se too large for a contact body—be used as a contact body, the liquid supplied on the top would be discharged to the front and the rear of the contact body already after a relatively short distance so that the liquid would then no longer be available for an exchange with the gas flow. In contrast, it is essential for a contact body according to this patent application that the liquid is kept in the interior of the contact body during its entire flow path from top to bottom through the contact body. For the reasons named above, built-in elements for cooling towers are accordingly not suitable for use as a contact body within the meaning of this application.

SUMMARY OF THE INVENTION

Accordingly, for this invention, the objective first presents itself of creating a contact body of the type mentioned above which avoids the above presented disadvantages and realizes, in particular, high stability, good permanent durability, economic manufacture, and good efficiency with a compact design. Moreover, the contact body should be easy to clean and prevent the passage of light. Furthermore, the objective is to create an evaporation humidifier or material exchanger with at least one corresponding contact body.

The solution of the first part of this objective is successful according to the invention with a contact body of the type mentioned above, characterized in that the material layers each comprise a film of thermoplastic plastic;

the material layers are interconnected by welding and/or bonding and/or a positive fit;

the corrugation axes at two longitudinal edges of each material layer comprise a corrugation axis section that runs approximately in an orthogonal direction in relation to the respective longitudinal edge, and the corrugation axes between the corrugation axis sections have regions extending obliquely to the longitudinal edges and running in at least two different directions with at least one change of direction in between, in such a way that, within each corrugated material layer, the corrugation axes change direction at least three times;

the corrugation axes in a first oblique region lie at an angle $\alpha 1$ to one longitudinal edge neighboring it, and in a second oblique region, they lie at an angle $\alpha 2$ to the other longitudinal edge neighboring it;

the angles $\alpha 1$ and $\alpha 2$ are between 30° and 60°; and the corrugated material layers each have a corrugation height of less than 12 mm.

The directional changes of the corrugation axis, as provided according to the invention, which are present at least three times within each material layer advantageously result, on the one hand, in a mechanical stabilization of not only each individual material layer but also, overall, of the contact body created therefrom, due to which it remains, even at a large volume, still very light and at the same time very stable. A second advantage of the contact body according to the invention is that—due to the multiple directional changes of the corrugation axis—there are no possibilities of rectilinear passage for the gas flow and for light rays. Thus, the dwell period of the gas flow is increased which flows through the contact body because the gas flow undergoes, in the contact body, a higher flow resistance and a higher turbulence due to the at least triple deflection at the directional changes of the corrugation axes. The resulting turbulent air flow favors the take up of humidity from the liquid into the gas flow and/or the material exchange between liquid and gas. At the same time, any transmission of light from the outside extending through the contact body is safely precluded which is a nuisance for some applications of the contact body—e.g. in a stable with an artificial day/night rhythm—because the directional changes of the corrugation axes result in a complete shielding of light rays hitting the contact body from the outside. To ensure the most favorable gas flow conditions when passing the gas into the contact body and when discharging the gas from the contact body, the corrugation axes comprise on the two longitudinal edges of each material layer the corrugation axis section that runs approximately in an orthogonal direction in relation to the respective longitudinal edge. Thus will be achieved that, upon gas entry and gas discharge, all partial gas flows run parallel to each other and respectively perpendicular to the upflow surface and the downflow surface of the contact body. Interfering flow obstructions are thus prevented. Moreover, every longitudinal edge area thus designed provides the advantageous possibility of a stable interconnection of the adjoining material layers which is, overall, very advantageous for the stability and strength of the contact body. The fact that the material layers each comprise a film of thermoplastic plastic, results in a high stability and permanent durability of the contact body, wherein the contact body is advantageously operated without any damage with acid, or treated with acid, if necessary, e.g. for decalcification, or it can also be mechanically cleaned with a high-pressure water jet, even with hot water. In practice, this will achieve service periods which are double or more than double as long as with conventional contact bodies. Although the material layers of film are not porous and accordingly do not absorb the liquid like paper, the contact body according to the invention has an evaporation or exchange capacity—due to the multiple directional changes of the corrugation axes and the turbulent gas flow—which is at least as good as the capacity of same sized conventional contact bodies of the abovementioned known materials. By using film of thermoplastic plastic, a permanently durable connection of the material layers can also be achieved by means of bonding. Even if, alternatively, the material layers according to the invention are interconnected by welding and/or a positive fit, a permanent bond of the material layers will be ensured which is not even negatively influenced by a frequent change of moisture and dryness. In conventional contact bodies of paper materials, any deposit, e.g. of calcium, on or in the material layers results in a reduced performance due to reduced porosity; however, in the contact body according to the invention, a light layer of deposits on the surfaces of the material layers may even result in an increased performance since this light layer of deposits promotes extensive wetting of the material layers by means of the liquid.

A preferred further development provides that the directional change lies between the oblique regions of the corrugation axes on a longitudinal center axis of the material layer. This embodiment achieves, on the one hand, a simple and, on the other hand, an advantageously symmetrical design—thus equally stable in all directions—of the material layers as well as of the contact body formed by it.

Furthermore, it is preferably provided that the corrugation axes on the one side of the longitudinal center axis extend parallel to each other and at the angle $\alpha 1$ to the longitudinal center axis and on the other side of the longitudinal center axis parallel to each other at the angle $\alpha 2$ to the longitudinal center axis. A suitable selection of angles $\alpha 1$ and $\alpha 2$ can specifically influence the properties of the contact body, e.g. to obtain a desired flow resistance for the air flow, or to optimize the evaporation or exchanger capacity. The properties of the contact body according to the invention can be adjusted in a relatively simple manner such that it is possible, without any problem, to replace a conventional contact body by a contact body according to the invention in existing plants for air humidification, cooling and/or cleaning, without any other additional technical changes to the plant being necessary.

An advantageously simple and symmetrical design is here advantageously achieved by the angles $\alpha 1$ and $\alpha 2$ being opposite to each other and having the same size.

Preferred is a size of the angles $\alpha 1$ and $\alpha 2$ of approximately 45° each, respectively measured in relation to the longitudinal center axis of the material layer. The corrugation axis respectively describes a deflection of 90° at the longitudinal center axis of each material layer.

Since the corrugation axis sections that run approximately in an orthogonal direction in relation to the longitudinal edges of the material layers of the contact body contribute only relatively little to the material exchange between gas flow and liquid flow, these corrugation axis sections should be kept relatively short. In this respect, it is preferably provided that the corrugation axis sections running approximately in an orthogonal direction in relation to the longitudinal edges each have an axial length which is equivalent to between 5% and 15% of the total length of the material layer measured between their longitudinal edges, perpendicularly to them.

In continuous use, the contact body is subject to the largest mechanical stress especially with regard to its upflow surface where the gas enters into the contact body and, although to a lesser extent, with regard to its downflow surface from which the gas flow escapes. To render the contact body particularly resistant here, it is provided that at least one marginal area extending from one of the longitudinal edges of each material layer has an increased material thickness. The increased material thickness moreover provides the advantage that the welding or formfitting connection of the material layers is improved and facilitated in these marginal areas and thus provides a particularly stable connection. Moreover, the increased material thickness reduces the risk of damage to the contact body when it is cleaned by a high-pressure water jet.

The marginal area with increased material thickness extending from one of the longitudinal edges is preferably a marginal area on the gas upflow side which is particularly expedient when the gas flow entrains abrasive solid particles, e.g. dust or sand, which are then separated from the gas flow in the contact body.

With identical design, the material layers can be differently arranged relative to each other; different properties of the contact body can be achieved thereby. A first embodiment to this effect provides that two respectively neighboring material layers adjoin each other with corrugation axes crossing each other in the oblique regions. In this arrangement, the gas flow resistance in the contact body will be relatively low, and a humidification of the gas is then primarily effected by turbulences of the gas flow.

An alternative embodiment provides that two neighboring material layers each adjoin each other with corrugation axes which are parallel to each other. In this arrangement, the gas flow resistance in the contact body will be relatively high, and a gas humidification is then primarily effected by gas being pressed through collections of liquid in the deepest areas of the corrugation. This results in a high humidification of the gas, which, however, requires a higher delivery rate for the gas; a fan of a corresponding capacity can provide this delivery rate, for example.

The flow paths for the gas should be relatively short to achieve the desired turbulent flow of the gas on the inside of the contact body. It is preferably provided that the corrugation height of the corrugated material layers is between 6 and 10 mm, preferably about 8 mm.

For the purpose of increasing the mechanical stability and to increase the wettable surface of the contact body without any volume increase, a flat additional material layer can be provided—between two corrugated material layers each— which can be designed without perforations or with perforations.

This layer serves as a light barrier in some applications of the contact body. It is preferably provided for it that the thermoplastic plastic forming the material layers is stained dark, preferably black. Any incident light will thus be largely absorbed.

A further embodiment preferably provides that the thermoplastic plastic forming the material layers is stained with activated carbon. This provides a black color of the plastic material and, at the same time, renders it resistant to UV radiation which is important if the contact body is exposed to solar radiation. In contrast, known contact bodies of paper materials become brittle relatively fast when exposed to light and are thus rendered highly prone to damage or even useless.

To promote the turbulence of the gas flow in the contact body, it is further proposed that the material layers, in addition to their corrugation, comprise turbulence-generating or turbulence-increasing structures which are smaller in relation to the corrugations.

Specifically, the aforementioned structures can be formed, for example, by embossments of the material layers. Since the material layers comprise a thermoplastic plastic, the embossments can e.g. be provided easily and in a permanently stable manner by means of a hot tool, expediently already when the corrugation of the material layers is produced.

To be able to connect the material layers as quickly and as simply as possible, it is preferably provided that the welding and/or bonding and/or positive fit interconnections of the material layers are selective connections in respectively touching surface areas of two neighboring material layers. Corresponding welding points can be produced e.g. by means of heatable welding spikes or lances; for a bonding connection, adhesive points are expediently placed, and positive fit connecting points can be designed and manufactured e.g. like snap fasteners. All indicated types of connection are very long-lastingly durable on the material layers comprising thermoplastic plastic, and they are not damaged by either the type of liquid or the changing wet/dry conditions.

It is proposed that the plastic preferably is polypropylene (PP) or polyethylene (PE) or polystyrene (PS) or polyvinyl chloride (PVC). Due to their properties, these plastics are particularly suitable for use in the contact body because they are economical, easily wettable, durable and strong.

As already specified in the beginning, in addition to a contact body, this invention also relates to an evaporation humidifier or material exchanger with at least one contact body of the above specified type. The evaporation humidifier or material exchanger according to the invention is characterized in that the contact body is arranged as a wall-type element in the evaporation humidifier or material exchanger, with the material layers with vertically extending longitudinal edges lying in vertical planes, and wherein the length of the material layers between their longitudinal edges which defines the thickness of the contact body is smaller than one height and width of the contact body. In relation to the height and width, the thickness of the contact body is thus relatively small in the evaporation humidifier or material exchanger according to the invention; however, due to the design of the contact body according to the invention, adequate contact and exchange between the liquid and the gas flow is ensured even if the gas flow passes through the contact body in the direction of its smallest dimension. Thus, evaporation humidifiers or material exchangers can be created which can be arranged in the walls of buildings and which are as such not or not considerably thicker than the building wall in which they are provided. Thus, a very space-saving installation of evaporation humidifiers or material exchangers in buildings will be possible. In already existing buildings with window openings, it is also advantageously possible to replace one window or a plurality of windows by appropriately manufactured evaporation humidifiers or material exchangers according to the invention, for example, for cooling the interior space of the building.

It is further preferably provided for the evaporation humidifier or material exchanger according to the invention that the gas which can be passed through the contact body is air or air laden with gaseous and/or liquid and/or solid pollutants or contaminants. In this case, the evaporation humidifier or material exchanger either serves to humidify and cool the air, or to clean it; and such air can either be cleaned coming from the outside surroundings prior to its supply into a building, or the waste air from a building or from a device emitting pollutants can be cleaned prior to its being discharged into the atmosphere.

For the evaporation humidifier or material exchanger according to the invention, it is furthermore preferably provided that the liquid which can be passed through the contact body is water or an acid or a lye. The use of water especially effects the humidification and cooling of the gas flow passed through the contact body. When acid or a lye is used, the liquid is especially used for a chemical reaction with the gas flow passing through the contact body. In case of the ventilation of stables, this reaction can consist, for example, of separating ammonia from the air passed through the contact body by means of chemical absorption with the aid of sulfuric acid as the liquid. In this case, ammonia is converted with sulfuric acid to ammonium sulfate which is discharged with the acid. Since the contact body of the evaporation humidifier or material exchanger according to the invention consists of thermoplastic film, even aggressive liquids, such as acids or lyes, can be used without damage to the contact body. With contact bodies made of paper materials, such aggressive liquids would result in fast damage or destruction.

The invention furthermore proposes for the evaporation humidifier or material exchanger that the at least one contact body is detachably and replaceably held in a holding frame of the evaporation humidifier or material exchanger. Thus, if necessary, fast maintenance of the evaporation humidifier or material exchanger will be possible. At the same time, it is possible to clean the contact body of the evaporation humidifier or material exchanger optionally in built-in condition or alternatively in dismounted condition and to then use it again because—due to their high mechanical and chemical resistance—the individual contact bodies can be treated for cleaning, without any resulting damage, not only by means of a high-pressure water jet, even of hot water, but also chemically, by means of a decalcifier, for example.

Finally, it is also provided for the evaporation humidifier or material exchanger according to the invention that at least one circulating pump is allocated to it, for the liquid to be passed through the contact body, and/or at least one fan for the gas to be passed through the contact body. The evaporation humidifier or material exchanger will thus be independent of external components which ensures problem-free operation of the evaporation humidifier or material exchanger.

BRIEF DESCRIPTION OF THE DRAWINGS

Two exemplary embodiments of the invention are explained below on the basis of a drawing. In the Figures.

DETAILED DESCRIPTION OF THE PREFERRED EMBODIMENT

Figure 1:
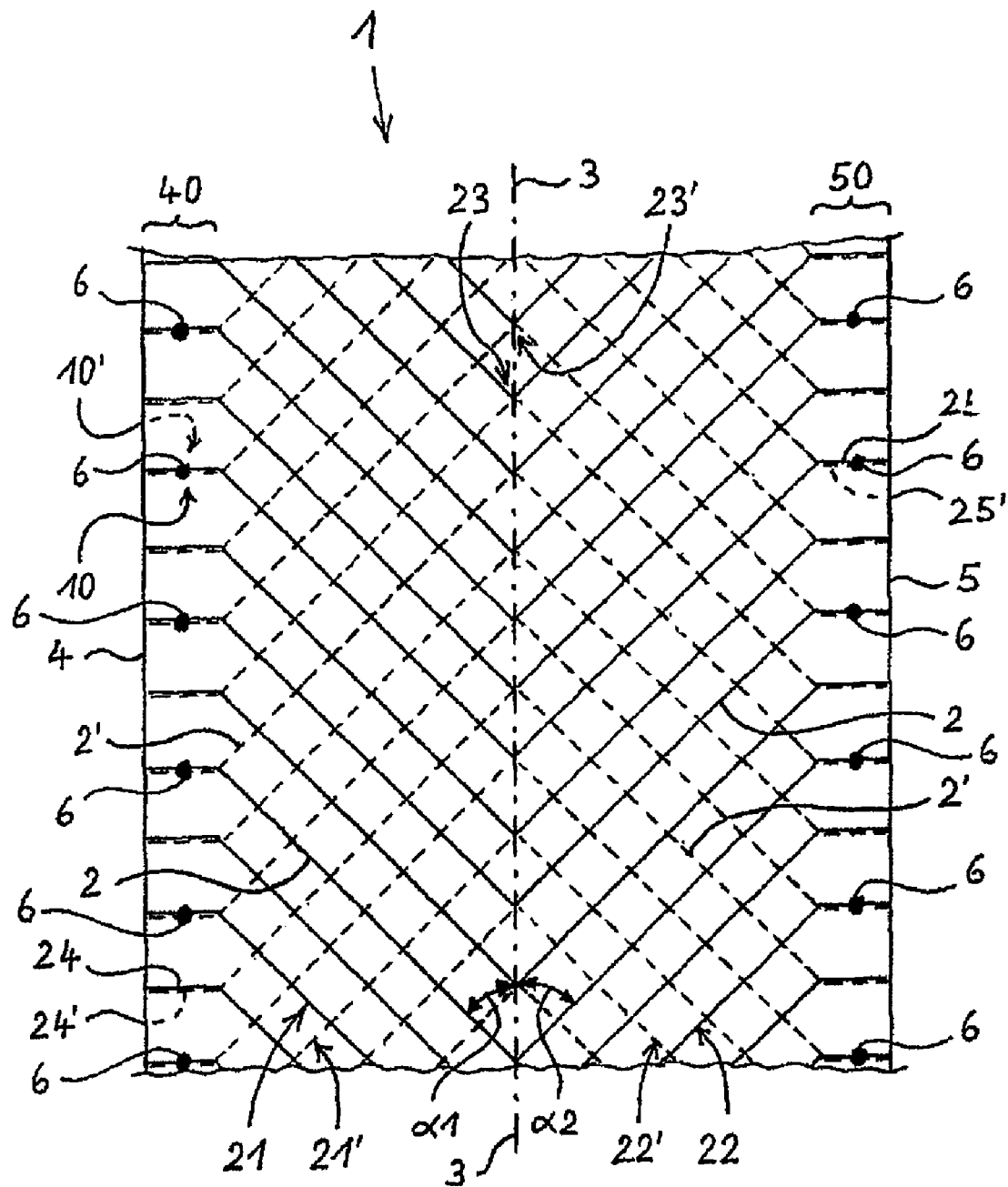
FIG. 1 shows a section of a contact body in a schematic side view.

According to FIG. 1, the contact body 1 comprises a plurality of material layers 10 and 10' which are here each aligned in parallel with the drawing plane and arranged behind as well as adjacent to each other and connected with each other in a suitable manner to form the contact body 1. In use, the material layers 10, 10' within the contact body 1 are usually in vertical planes.

All material layers 10, 10' comprise a corrugation structure with corrugation axes 2 and 2' respectively which are each equivalent to the course of a corrugation trough or a corrugation peak of the corrugation structure.

The material layer 10 which faces the viewer in the Figure of the drawing has a corrugation with the corrugation axes 2 presented by solid lines. In its cross-section, the corrugation may be e.g. sinusoidal, trapezoidal or orthogonal. Starting from the left longitudinal edge 4 in FIG. 1, the corrugation axis 2 first runs horizontally to the right, with a corrugation axis section 24 being formed thereby which defines a marginal area 40 of the contact body 1. Further to the right, the corrugated axes 2 extend in an area 21 obliquely downward to a longitudinal center axis 3 of the material layer 10. The corrugation axes 2 there effect a change of direction 23 of approx. 90° and then, further to the right, run upward again in an area 22. The corrugation axes 2 again run horizontally in a marginal area 50 provided on the right longitudinal edge 5.

Relative to the left longitudinal edge 4 and the longitudinal center axis 3 parallel thereto, the corrugation axes 2 left of the longitudinal axis 3 form the angle $\alpha 1$ and, mirror symmetrically thereto, to the right of the longitudinal center axis 3, the angle $\alpha 2$. The angles $\alpha 1$ and $\alpha 2$ are each 45° here, thus the angle of 90° results for the directional change 23 in the course of the corrugation axes 2 at the longitudinal center axis 3.

In the second material layer 10' which here lies directly behind the first material layer 10 facing the viewer, the corrugation axes 2' drawn in a dashed line run in the marginal areas 40 and 50 parallel to the corrugation axes 2 of the first material layer 10 so that corrugation axis sections 24' and 25' are formed in the second material layer 10' which are located in the marginal areas 40 and 50 and are in parallel with the corrugation axis sections 24 and 25 of the first material layer 10 in these marginal areas 40 and 50 of the contact body 1. Here, the first material layer 10 each—with a corrugation bottom area facing the second material layer 10'—adjoins that corrugation crest area of the second material layer 10' which faces the first material layer 10. In these adjoining areas, a connecting point 6 each is provided in the form of a welding or bonding or positive fit connection.

In the further course, the corrugation axes 2' have a symmetrically opposite course to the corrugation axes 2. This can simply be achieved by the second material layer 10' identical in form with the first material layer 10 being turned upside down relative to the first material layer 10. Thus will be achieved that the corrugation axes 2 and 2' cross each other, in the presented exemplary embodiment under an angle of 90°. Considering the course of the corrugated axes 2' from left to right, the horizontal corrugation axis section 24' accordingly results first, extending from the left longitudinal edge 4 of the material layer 10'. On the right side of the marginal area 40, the corrugation axes 2' extend in an area 21' obliquely upward up to the longitudinal center axis 3. From a directional change 23' there provided, the corrugation axes 2' drop in an area 22' obliquely to the right bottom down to the right marginal area 50. The corrugation axes 2' then extend horizontally again as corrugation axis sections 25' within the marginal area 50.

With the corrugation of the material layers 10 and 10' as explained by means of the example in the drawing, a space lattice is formed—by joining a plurality of alternating material layers 10 and 10'—through which, for example, a gas flow, e.g. an air flow, can flow horizontally from the left to the right, and through which a liquid flow, e.g. a water flow, can trickle vertically from the top to the bottom. The gas thereby absorbs moisture from the liquid flow, as a result of which the gas flow is humidified and cooled. The gas can moreover be cleaned thereby, e.g. dust can be removed.

The material for the material layers 10, 10' is a thermoplastic plastic, e.g. polypropylene (PP) or polyethylene (PE) or polystyrene (PS) or polyvinylchloride (PVC). The film can be preferably and advantageously manufactured in an extrusion and continuous process under the influence of heat and forming tools which allows a very efficient production. After cooling, the film is fixed in its form and has good stability even with low material thickness, especially after connecting the individual material layers 10, 10' to the contact body 1. The material layers 10, 10' can first be produced as larger film sheets and formed thermally, and after cooling and solidification in their form, they can be cut to the desired and required lengths and widths. Moreover, with the described mode of production, it is possible to vary the material thickness of the material layers 10, 10' over their width, providing increased material thickness, especially in the two marginal areas 40 and 50. In these marginal areas 40 and 50, the individual material layers 10, 10' are connected with each other, for example, by means of thermal fusion welding in a simple and durable manner to form the contact body 1.

In deviation from the example in the drawing, the angles $\alpha 1$ and $\alpha 2$ can of course have other and/or varying values. Also, the corrugation axes 2 and 2' may comprise a higher number of directional changes 23, 23' than the three directional changes presented in the example.

Figure 2:
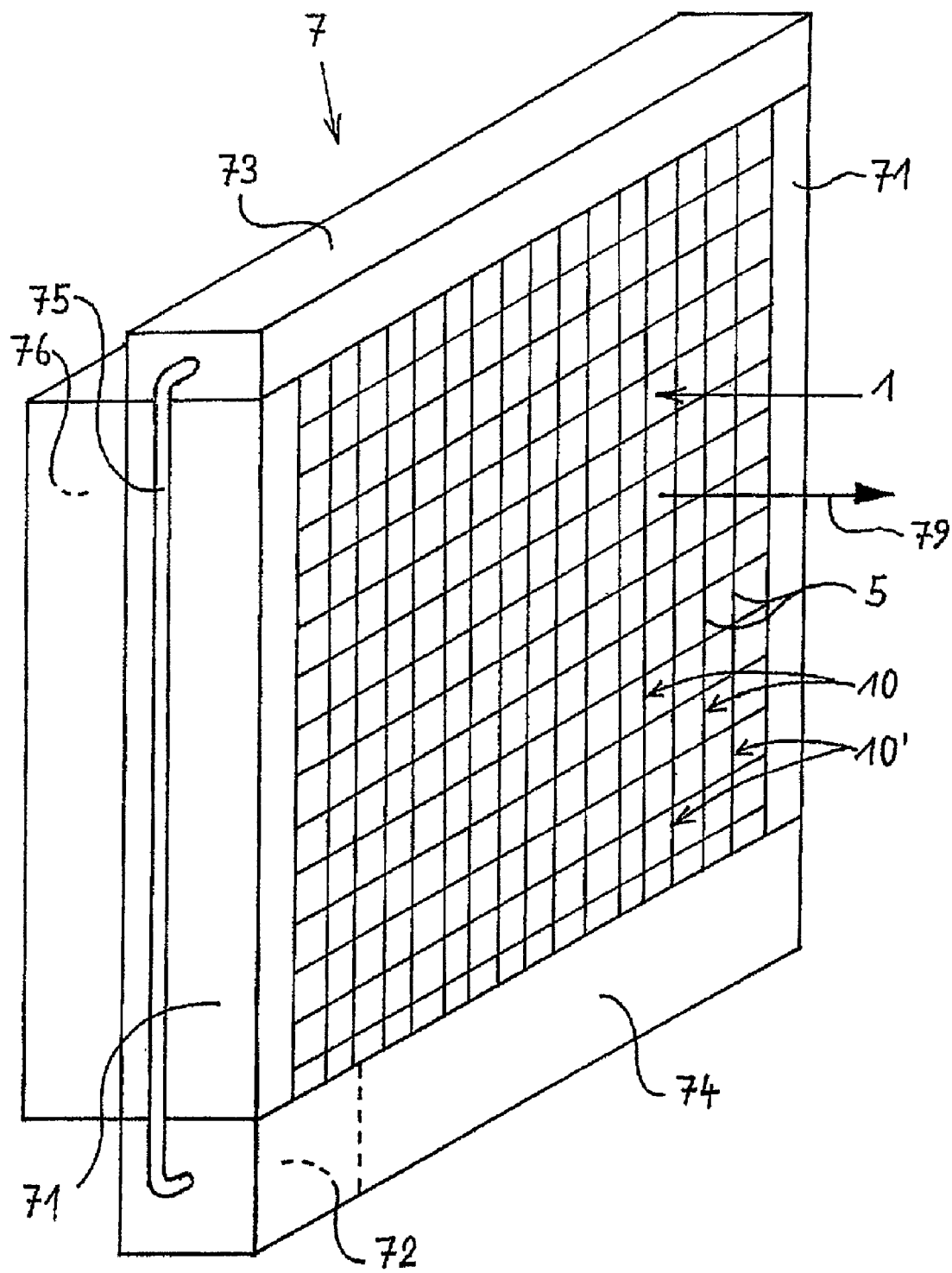
FIG. 2 shows an air humidifier or material exchanger with a contact body.

FIG. 2 of the drawing shows one example of an evaporation humidifier or material exchanger 7 in a schematic perspective view, the evaporation humidifier or material exchanger 7 being provided with one or a plurality of contact body/bodies 1. The arrangement of one or a plurality of contact body/bodies 1 is removably mounted in a holding frame 71 provided laterally on both sides so that simple removal and installation of the contact bodies 1 will be possible, as needed. On the top, a liquid distributor 71 is provided above the arrangement of the contact bodies 1, and liquid is introduced from the top into the arrangement of the contact bodies 1 and distributed as evenly as possible over their top. The liquid—water or acid, for example—trickles through the arrangement of the contact bodies 1 forming a spatial structure from the top to the bottom under the effect of gravity, and in this manner, it finally reaches a liquid collector 74 which is trough-like in design and provided underneath the arrangement of the contact bodies 1. In the presented exemplary embodiment, a circulating pump 72 is provided in the interior of this liquid collector 74 and delivers via a liquid line 75 the liquid from the liquid collector 74 to the liquid distributor 73 from where the liquid again flows or trickles to the bottom through the arrangement of the compact bodies 1. Spent liquid is refilled manually or automatically as needed.

In cross flow to the liquid, a gas flow is passed in the direction of the flow arrow 79 in an essentially horizontal direction through the arrangement of the contact bodies 1. A fan 76 is used for this—arranged on the rear of the evaporation humidifier or material exchanger 7 in FIG. 2, facing away from the viewer; and the fan is circumferentially surrounded by a circumferential protective wall.

Within the arrangement of the contact bodies 1, the material layers 10 and 10', already described in FIG. 1, are alternately arranged in vertical direction, and the longitudinal edges 5 of the material layers 10, 10' face the viewer.

On the inside of the arrangement of the contact bodies 1, the liquid flow and the gas flow running in cross flow thereto are in exchange with each other with the flow direction 79; a part of the liquid evaporates, and the gas flow is thus humidified and cooled as well. At the same time, the gas flow can be cleaned in the evaporation humidifier or material exchanger 7 such that, for example, solid or liquid particles are washed out of the inflowing gas flow or such that a chemical reaction takes place between gas and liquid.

As clearly shown in FIG. 2, the arrangement of the contact bodies 1 in horizontal direction—i.e. seen in the direction parallel to the gas flow direction 79—has relatively little thickness or depth so that it is possible to install the evaporation humidifier or material exchanger 7 without any problem in walls of buildings or in housings of machines or plants. Due to the course of the corrugation axes, as illustrated in FIG. 1, with multiple directional changes, even an only slight thickness of the contact bodies 1 results in an intensive exchange and intensive interaction between liquid flow and gas flow so that high efficiency is ensured with a compact design.

Figure 3:
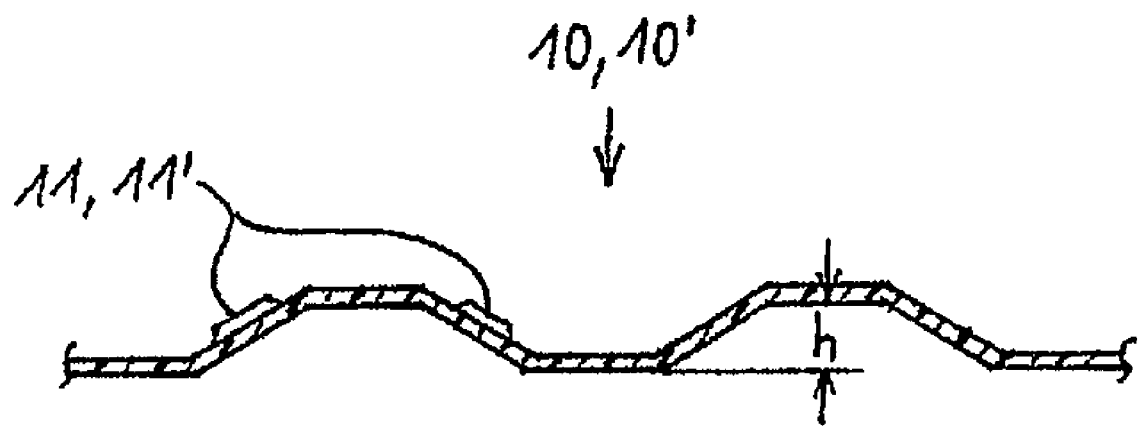
FIG. 3 shows a section from an individual material layer of the contact body in a cross-section.

FIG. 3 of the drawing shows a section of an individual material layer 10 or 10' of the contact body 1 in cross-section. The corrugation is here trapezoidal in design with a height h. In addition to the corrugation, the material layer 10 or 10' has yet smaller structures 11, 11' in the form of raised embossments which contribute to generate the desired turbulences in the gas flow passing over the material layers 10, 10'.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A contact body for an evaporation humidifier or material exchanger for humidifying, cooling and/or cleaning of gases, the contact body comprising a plurality of corrugated material layers which adjoin each other and thus form a space lattice structure, wherein a liquid can be passed from the top through the contact body and a gas flow can be passed through in cross flow to the liquid for humidification, cooling and/or cleaning of the gas flow, the material layers each comprising:
   a film of thermoplastic plastic;
   material layers being interconnected by at least one of welding, bonding and positive fit;
   corrugation axes at two longitudinal edges of each material layer comprising a corrugation axis section that runs approximately in an orthogonal direction in relation to the respective longitudinal edge, and the corrugation axes between the corrugation axis sections having regions extending obliquely to the longitudinal edges and running in at least two different directions with at least one change of direction in between, in such a way that in each material layer the corrugation axes change direction at least three times;
   the corrugation axes in a first oblique region lying at an angle $\alpha 1$ to one longitudinal edge neighboring it, and in a second oblique region, they are lying at an angle $\alpha 2$ to the other longitudinal edge neighboring it;
   the angles $\alpha 1$ and $\alpha 2$ are between 30° and 60°; and
   the corrugated material layers each having a maximum corrugation height of 12 mM.

2. A contact body according to claim 1, wherein the directional change lies between the oblique regions of the corrugation axes on a longitudinal center axis of the material layer.

3. A contact body according to claim 2, wherein the corrugation axes on the one side of the longitudinal center axis extend parallel to each other and at the angle $\alpha 1$ to the longitudinal center axis, and on the other side of the longitudinal center axis, parallel to each other at the angle $\alpha 2$ to the longitudinal center axis.

4. A contact body according to claim 3, wherein the angles $\alpha 1$ and $\alpha 2$ are opposite to each other and have the same size.

5. A contact body according to claim 1, wherein the angles $\alpha 1$ and $\alpha 2$ are each approximately 45°.

6. A contact body according to claim 1, wherein the corrugation axis sections running approximately in an orthogonal direction in relation to the longitudinal edges each have an axial length which is equivalent to between 5 and 15% of the total length of the material layer measured between their longitudinal edges perpendicularly to them.

7. A contact body according to claim 1, wherein at least one marginal area extending from one of the longitudinal edges of each material layer has an increased material thickness.

8. A contact body according to claim 7, wherein the marginal area with increased material thickness extending from one of the longitudinal edges is a marginal area on the gas upflow side.

9. A contact body according to claim 1, wherein two respectively neighboring material layers adjoin each other with corrugation axes crossing each other in the oblique regions.

10. A contact body according to claim 1, wherein two neighboring material layers each adjoin each other with corrugation axes which are parallel to each other.

11. A contact body according to claim 1, wherein the corrugation height of the corrugated material layers is between 6 and 10 mm.

12. A contact body according to claim 1, wherein between two corrugated material layers each, a flat additional material layer is provided.

13. A contact body according to claim 1, wherein the thermoplastic plastic forming the material layers is stained dark.

14. A contact body according to claim 13, wherein the thermoplastic plastic forming the material layers is stained with activated carbon.

15. A contact body according to claim 1, wherein the material layers, in addition to their corrugation, comprise turbulence-generating or turbulence-increasing structures which are smaller in relation to the corrugations.

16. A contact body according to claim 15, wherein the structures are formed by embossments of the material layers.

17. A contact body according to claim 1, wherein the welding, bonding and positive fit interconnections of the material layers are selective connections in respectively touching surface areas of two neighboring material layers.

18. A contact body according to claim 1, wherein the plastic comprises one of polypropylene (PP), polyethylene (PE), polystyrene (PS) and polyvinylchloride (PVC).

19. An evaporation humidifier or material exchanger with at least one contact body according to claim 1, wherein the contact body is arranged as a wall element in the evaporation humidifier or material exchanger, with the material layers with vertically extending longitudinal edges lying in vertical planes and wherein the length of the material layers between their longitudinal edges which defines the thickness of the contact body is smaller than one height and width of the contact body.

20. An evaporation humidifier or material exchanger according to claim 19, wherein the gas which can be passed through the contact body comprises one of air and air laden with one or more of gaseous, liquid and solid pollutants or contaminants.

21. An evaporation humidifier or material exchanger according to claim 19, wherein the liquid which can be passed through the contact body is one of water, an acid and a lye.

22. An evaporation humidifier or material exchanger according to claim 19, wherein at least one contact body is detachably and replaceably held in a holding frame of the evaporation humidifier or material exchanger.

23. An evaporation humidifier or material exchanger according to claim 19, further including at least one of a circulating pump, for the liquid to be passed through the contact body, and one fan for the gas to be passed through the contact body.

* * * * *